Figure 1:
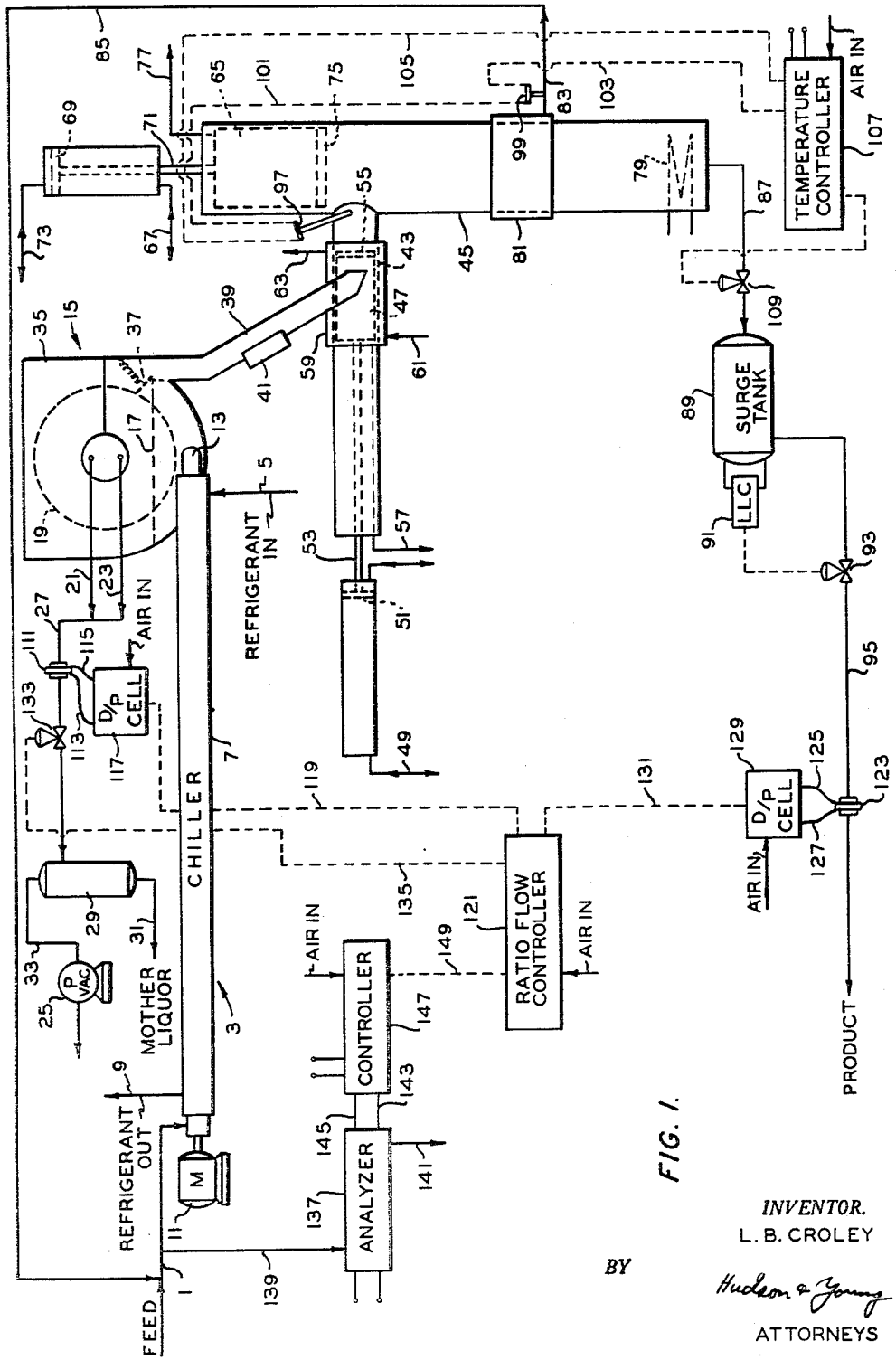

June 14, 1960  L. B. CROLEY  2,940,272
SEPARATION BY CRYSTALLIZATION
Filed Jan. 3, 1955  2 Sheets-Sheet 1

INVENTOR.
L. B. CROLEY
BY
Hudson & Young
ATTORNEYS

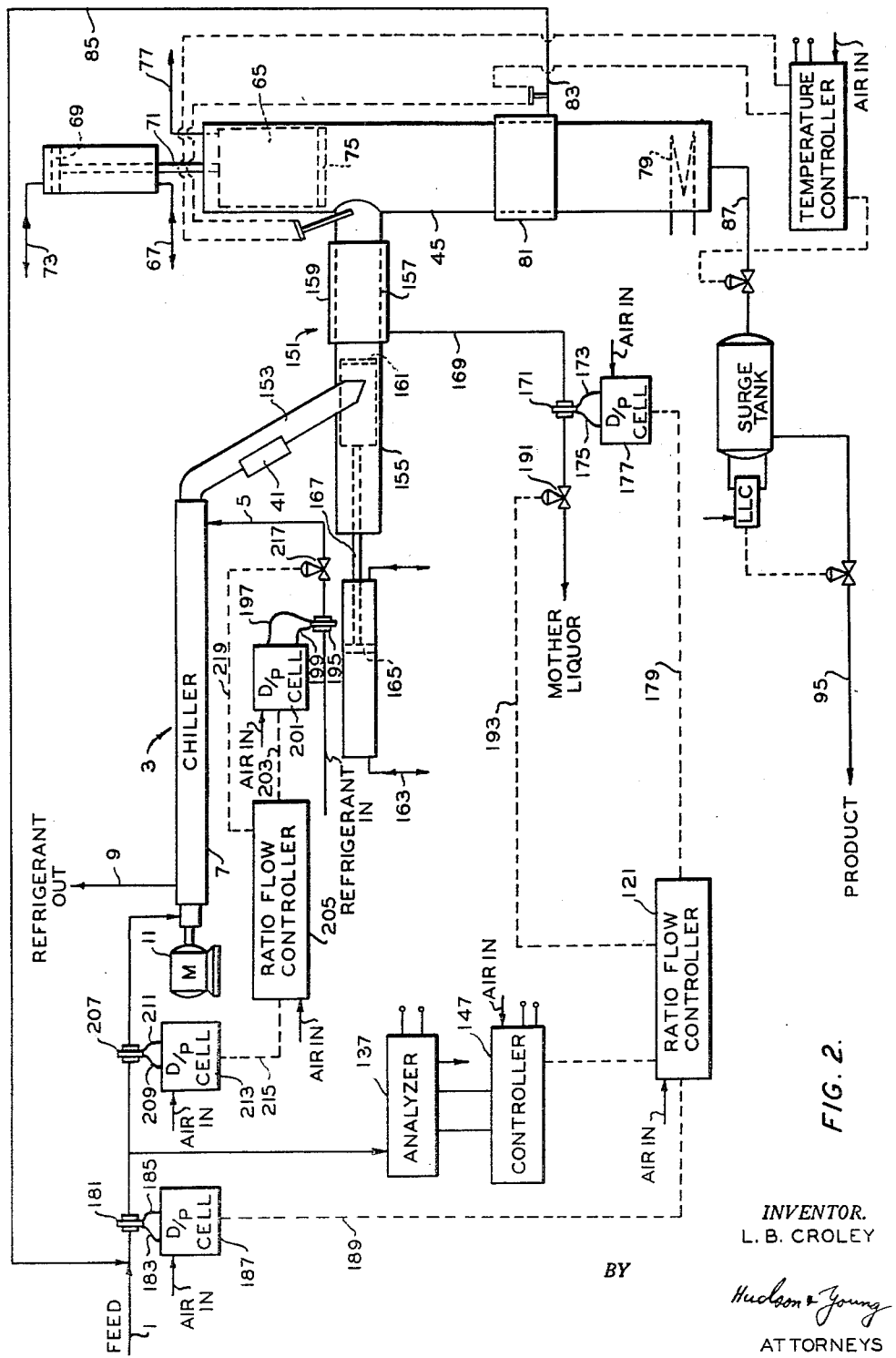

United States Patent Office 2,940,272
Patented June 14, 1960

2,940,272
SEPARATION BY CRYSTALLIZATION

Leo B. Croley, Bartlesville, Okla., assignor to Phillips Petroleum Company, a corporation of Delaware Filed Jan. 3, 1955, Ser. No. 479,310

14 Claims. (Cl. 62—58)

This invention relates to separation by crystallization. In one aspect, this invention relates to the separation of components of mixtures by fractional crystallization. In a more specific aspect, this invention relates to an improved method and means for controlling the separation of components of mixtures by fractional crystallization.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above that at which the other components solidify. Thus, whereas distillation and extraction theoretically require infinite stages for a pure product, crystallization in many cases requires only one. This is because of the nature of the phase equilibria in distillation and extraction, while by crystallization, substantially pure crystals can be formed from many solutions in one stage, although the desired component may be of low concentration in the liquid feed.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required.

In order to separate constituents of mixtures by fractional crystallization, it is necessary to adjust the temperature of the mixture to one which is below the temperature at which crystals of any one of the pure constituents form. For example, when para-xylene is separated from a mixture of isomeric $C_8$ alkyl benzenes, it is necessary to cool the mixture to a temperature in the neighborhood of about —57° to about —78° C.

Methods of separating a pure component from a mixture have been devised whereby the mixture to be separated is introduced into a heat exchange zone wherein a mixture of crystals and liquid is formed and that mixture is then introduced into an elongated purification chamber through which the crystals are moved as a compact mass. One such means for purifying crystals has been disclosed by J. Schmidt, Re. 23,810.

In the process disclosed by J. Schmidt, a mass of crystals is moved through an elongated chamber to a melting zone wherein the crystals are melted. A portion of liquid corresponding to the melt is caused to move countercurrently through at least a portion of the crystal mass so as to displace occluded impurities from the crystal mass approaching the melting zone. The exact mechanism whereby this displacing liquid corresponding to the melt improves the purity of the final product is not completely understood. However, it is presently believed that the substantially pure material which is refluxed through at least a portion of the crystal mass displaces occluded impurities from the crystal mass approaching the melting zone and replaces the impurities in the interstices. At least a portion of the pure material is refrozen on the surface of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of impurities and the resulting product which is removed from the melting zone is of extremely high purity.

It is highly desirable for the best operation of such a purification system to remove as much of the mother liquor from the crystals as possible before introducing those crystals into the purification chamber to be compacted. In this manner, a portion of the impurities can be eliminated from the purification system before subjecting the crystals to the final purification step. This is usually accomplished in a preconcentration zone which includes a filtering means for separating crystalline from non-crystalline material.

Several different types of filters can be used in such a preconcentration zone for separating mother liquor from the crystals, such as a rotary filter, a centrifuge or a pressure-type filter in which the crystals are partially compacting means such as an auger or a piston. The operation of the filter and the crystal purification column depends for its efficiency primarily on one variable that is unique in fractional crystallization processes as compared with conventional separation processes, such as fractional distillation or solvent extraction. This variable is the solids content of the partially frozen streams as they pass through the steps of the process. There is no known means for conveniently, continuously analyzing such a partially frozen stream for the percent solids therein and, therefore, fine control of a fractional crystallization process is difficult to attain. It is desirable to maintain the solids content at constant values in the various steps of the process in order to achieve the optimum efficiency of which the process is capable. For example, an undue decrease in solids content in a partially frozen stream lowers the effectiveness of the process so that a lower yield of a given purity of product is produced. Effective operation demands a system for maintaining the solids content of the various partially frozen streams at constant optimum levels. The most important stream in a fractional crystallization process, in this respect, is the crystal slurry which is passed into the crystal purification column. It is essential that the solids content of this stream be maintained at a constant level. Since there is no convenient device for continuously indicating the solids content of such a stream, a control system for the fractional crystallization process which maintains the solids content constant at the desired level is needed.

It is an object of this invention, therefore, to provide a system for separating components of mixtures by fractional crystallization.

It is a further object to provide an improved method for controlling the separation of components of mixtures by fractional crystallization.

It is a still further object to provide a method and means for maintaining the solids content in crystal slurries in a fractional crystallization process at a constant level.

Other objects of the invention will be apparent to those skilled in the art upon study of the accompanying disclosure and drawings in which:

Figure 1 is a schematic representation of an embodiment of the fractional crystallization system of this invention; and Figure 2 is a schematic representation showing modifications of the fractional crystallization system of this invention.

In accordance with the invention, the rate of flow of mother liquor from a preconcentration zone in a fractional crystallization process is maintained in a preselected ratio to either the rate of flow of product from said process or the rate of flow of feed to said process. I have discovered that the result of the application of this invention to a fractional crystallization process is that a constant solids content is maintained in the crystal slurry passed from the preconcentration zone to the crystal purification column, thus affording optimum efficiency in the process. Better separation occurs when the rate of flow of mother liquor from the preconcentration zone is maintained in a preselected ratio to the rate of flow of product from the crystal purification column, and therefore, this is the preferred embodiment of the invention. Further in accordance with this invention, an analyzer continuously monitors the composition of the feed stream to the process and continuously adjusts the ratio between the rate of flow of mother liquor from the preconcentration zone and the rate of flow of product from the process or the ratio between said mother liquor rate of flow and the rate of flow of feed to the process to compensate for changes in the feed composition. This aids in maintaining an even more constant solids content in the crystal slurry passed from the preconcentration zone to the crystal purification column. Still further in accordance with this invention, the rate of flow of refrigerant through the chiller in the preconcentration zone is maintained in a preselected ratio to the rate of flow of feed to the process to further aid in maintaining a constant solids content in the crystal slurry passed into the crystal purification column.

Although this invention is particularly applicable to systems in which the temperature at which crystals of the desired pure component form is considerably higher than the temperature to which the component is cooled in the liquid mixture to form crystals thereof, this procedure can be advantageously utilized in practically any system to which fractional crystallization is applicable so as to increase the efficiency of the process. This invention is applicable to the separations in many multipcomponent systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a product purity upwards of 98 percent. In order to illustrate some of the systems to which the invention is applicable, the following compounds are grouped with respect to their boiling points.

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethylbutane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
|---|---|---|
| ortho-Xylene | 144 | −27.1 |
| meta-Xylene | 138.8 | −47.4 |
| para-Xylene | 138.5 | 13.2 |

| Group G | B.P., °C. | F.P., °C. |
|---|---|---|
| ortho-Cymene | 175.0 | −73.5 |
| meta-Cymene | 175.7 | <−25 |
| para-Cymene | 176.0 | −73.5 |

| Group H | B.P., °C. | M.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
|---|---|---|
| ortho-Nitrotoluene | 222.3 | α −10.6, β −4.1 |
| meta-Nitrotoluene | 231 | 15.5 |
| para-Nitrotoluene | 238 | 51.3 |

Systems consisting of any combination of two or more of the components within any one of the groups may be separated by the process of the invention, as well as systems made up of components selected from different groups; for example, benzene may be separated from a benzene-, n-hexane or n-heptane system in which the benzene is present in an amount greater than the eutectic concentration. In the same manner, para-xylene may be readily separated from a mixture of para- and meta-xylenes or from para-, meta-, and ortho-xylenes, or from a mixture of para-, meta-, and ortho-xylenes plus ethylbenzene and other compounds. Benzene may also be separated from admixture with toluene and/or aniline.

Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone, (1,4-benzenediol), paracresol, paradichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors can also be concentrated in such a process. The process is also applicable to the concentration of vegetable juices.

Referring now to the drawings, Figure 1, a feed stream is passed via a line 1 to a scraped surface chiller 3 by a pump, not shown, which supplies the feed to the process at a constant pressure. The embodiments of this invention which are described in connection with Figure 1 of the drawings are described with reference to the recovery of para-xylene from a mixed xylene stream. However, it should be understood that the invention is not limited to this system and is equally applicable to the separation of a great number of mixtures as has been described hereinbefore. It is desirable that the crystallizable component in the feed mixture be present in an amount considerably greater than the eutectic composition of the feed mixture. Crystals formed from a mixture which is considerably richer in the crystallizable component than the eutectic composition are at a higher temperature than crystals formed from a leaner mixture and are more easily processed in subsequent purification steps. In the recovery of para-xylene from a feed mixture containing about 15 percent para-xylene, it is necessary to cool the mixture to about −100° F. in order to crystallize a major portion of the para-xylene present in excess of the eutectic composition. In a feed mixture containing ortho-xylene, meta-xylene and ethylbenzene in addition to para-xylene, the eutectic composition contains about 6 percent para-xylene. However, if the mixture contains about 60 percent para-xylene, it is only necessary to cool it to about −20° F. to crystallize a major portion of the para-xylene present. Although the process of this invention is operable on fairly lean feed mixtures, it is desirable to have a feed which contains the crystallizable component in an amount considerably in excess of the eutectic composition. In the recovery of para-xylene, for example, it is desirable that the feed contain from 30 to 70 percent para-xylene. In order to obtain such a feed for the crystal purification column, it is desirable to employ a preconcentration zone.

The temperature of the feed mixture in chiller 3 is adjusted so as to obtain crystals of at least a portion of the crystallizable component in the mixture. Chiller 3 can be any conventional type chiller which is supplied with refrigeration means that are adequate to adjust the temperature of the mixture as described above. When, for example, a mixture of isomeric $C_8$ alkyl benzenes is fed through line 1 to chiller 3, that mixture is cooled to a temperature in the neighborhood of −57° to −78° C. A cooling medium is passed via a line 5 through a cooling jacket 7 and out a line 9 to accomplish the aforedescribed adjustment of the temperature of the feed mixture. Chiller 3 also includes a suitable scraper, not shown, which is rotated by a motor 11 to clean the inner walls of chiller 3 and to assist in passing the crystal slurry through chiller 3 and out a conduit 13.

The resulting slurry of crystals produced in chiller 3 is passed through the conduit 13 into a filter 15 wherein the non-crystalline material, or mother liquor, is separated from the crystals. Filter 15 is a vacuum filter and, for illustrative purposes, a rotary vacuum filter is shown. Other vacuum filters, such as a belt-type vacuum filter, can also be used. A constant level 17 of the crystal slurry is maintained in the bottom of filter 15 by a suitable level sensing device, not shown, which controls the rate at which a slurry is introduced to filter 15. The slurry level 17 can, of course, be maintained by hand control or any other suitable arrangement of automatic controls. Filter 15 comprises a rotatable drum 19 which is partially immersed in the slurry of crystals in the bottom of filter 15. Vacuum is applied to drum 19 by conduits 21 and 23. As drum 19 rotates through the slurry of crystals in the bottom of filter 15, a cake of crystals and mother liquor is formed upon drum 19 and mother liquor is removed from this cake through conduits 21 and 23 by a vacuum pump 25. The liquid mother liquor is passed via a conduit 27 to a liquid-gas separator 29. The liquid mother liquor is removed from separator 29 via a conduit 31 and entrained gases are removed from separator 29 via a conduit 33 to be returned to filter 15.

Drum 19 includes a filter medium or screen upon its outer surface and upon which the cake of crystals and mother liquor is formed. The screen can be formed from any suitable filtering means, such as cloth, paper, felt, glass fabric, synthetic fabrics or perforated or porous (sintered) metal or any combination of these or other filtering media as is necessary to effectively retain crystalline solids and pass liquid in the filtration of crystal slurries. Drum 19 is totally enclosed in a heavily insulated housing 35. Filter 15 also includes a spring loaded scraper 37 which is provided for removing crystals from rotating drum 19. As drum 19 rotates in a clockwise direction, the crystals are removed by scraper 37 and passed via a conduit 39 to a crystal purification means to be described hereinafter. An electrical vibrator 41 is attached to conduit 39 to aid the passage of the relatively dry crystals through conduit 39.

The crystals are passed through conduit 39 into a chamber 43 wherein the crystals are moved directly into the upstream portion of a crystal purification column 45 by a piston 47. Piston 47 is moved forward by fluid flow through a conduit 49 acting against a piston 51 connected to piston 47 by a piston rod 53 to such an extent that the forward face of piston 47 coincides with the side of purification column 45. Piston 47 has a porous face 55 which permits liquid in the crystals in chamber 43 to pass therethrough and out of chamber 43 via a conduit 57.

It is desirable to supply crystals to purification column 45 at a temperature which is sufficiently high to prevent freezing of the crystal mass to an impervious plug in column 45 or in chamber 43. To this end, heating material is passed through a heating jacket 59 which is about chamber 43 by means of an inlet conduit 61 and an outlet conduit 63. During this heating, some of the crystals are melted and, when the crystalline material is compacted in chamber 43 by piston 47, at least a portion of the thus-produced melt is removed via conduit 57 as a result of the compacting.

The crystals which have been moved into column 45 are moved as an elongated crystal mass downwardly by a piston 65. Piston 65 is withdrawn by means of fluid flow through a conduit 67 acting against a piston 69 which is connected to piston 65 by a piston rod 71. Piston 69 is moved in a downstream direction by flow of fluid through a conduit 73 against piston 69. Piston 65 also includes a porous face 75 which permits the passage therethrough of liquid from the crystal mass as it is compacted and out of column 45 via a conduit 77.

Thus, the crystals are moved downwardly through column 45 to a melting zone in the lower end of column 45 which includes a heating element 79. Heating element 79 can be any type of heating device, such as coils through which a heat exchange fluid is passed or an electrical heating element which may be either within or without chamber 45. A portion of the melt thus produced is displaced countercurrently to the movement of crystals and through a portion of the crystal mass so as to displace impurities from the crystal mass. The impurities which are displaced from the crystal mass are removed through a wall filter 81 and an outlet conduit 83. Under some conditions of operation, the concentration of material corresponding to the purified material in the stream removed through conduit 83, i.e., the wall filtrate, is higher than its concentration in the feed mixture introduced to the process via conduit 1. In this event, the material removed from column 45 via conduit 83 is passed via a conduit 85 back to the feed mixture in line 1 wherein it is utilized to enrich the feed mixture. This results in the formation of larger crystals than can be formed from a feed mixture containing a lower concentration of the desired component. However, if the concentration of the desired component in the stream removed via conduit 83 is low as compared to the feed stream, the material removed via conduit 83 may be disposed of as is desired.

Purified product is removed from column 45 through a conduit 87. The product is passed via conduit 87 to a surge tank 89. A constant level of liquid product is maintained in tank 89 by a liquid level controlling device 91 which operates a motor valve 93 in an outlet line 95 which conveys the product from tank 89 to storage or any other desired use.

In the copending application of S. J. Kolner, Serial No. 478,688, filed December 30, 1954, now Patent No. 2,835,598, there is disclosed and claimed an improved system for controlling the purity of the product from the crystal purification column 45. In accordance with the invention of application Serial No. 478,688, the pressure in the column 45 is controlled by controlling the product withdrawal rate. The effectiveness of the countercurrent displacement of the impurities by reflux in the lower section of column 45 is indicated by the temperature of the displaced material or its relationship to the temperature of the crystals fed to the purification column, since any channeling of reflux through the bed causes the temperature of the displaced material to rise. However, in the normal operation of any given system the temperature of the feed crystals remains substantially constant; therefore, a measure of the wall filtrate temperature itself reflects the temperature differential existing between the feed crystals and the displaced material, or wall filtrate. Thus a temperature sensitive element 97, such as a thermocouple, is positioned in the crystals at the downstream end of chamber 43 which is the inlet to column 45. A similar temperature sensitive element 99 is disposed in conduit 83 which carries the displaced material or wall filtrate from column 45. Temperature sensitive elements 97 and 99 are connected by electrical leads 101, 103 and 105 to a temperature-responsive back pressure controller 107°. A motor valve 109 is connected into conduit 87 between the product outlet in column 45 and surge tank 89. Controller 107 can be any of the conventional temperature controllers and operates motor valve 109 in response to a temperature differential existing between two points, i.e., between elements 97 and 99, or in response to a temperature measured at a single point, i.e., at element 99. Controller 107 is set so as to maintain the temperature of the filtrate in conduit 83 a preselected amount higher than the temperature of the crystals fed to column 45. When the temperature of the filtrate in conduit 83 rises above the preselected limits, controller 107 operates valve 109 to permit greater flow of product through conduit 87. This reduces the back pressure on column 45 and decreases the amount of reflux through the crystal bed, thus reducing the filtrate temperature. When the temperature of the filtrate in conduit 83 falls below the preselected limits, controller 107 operates valve 109 so as to reduce product flow through conduit 87, increasing the back pressure on column 45 thus tending to increase the temperature in conduit 83 as channeling conditions are approached. Channeling is caused by excessive reflux.

In accordance with this invention the rate of flow of non-crystalline material separated in filter 15 and passing through conduit 27 is maintained in a preselected ratio to the rate of flow of either the product in line 95 or the feed mixture in line 1. The preferred embodiment of this invention is illustrated in Figure 1 wherein the rate of flow of non-crystalline material, or mother liquor, is maintained in a preselected ratio to the rate of flow of product in line 95. To this end, an orifice plate 111 is connected into conduit 27 downstream of the point at which conduits 21 and 23 connect into conduit 27. A pair of tubes 113 and 115 are connected to plate 111 and transmit the differential pressure existing across orifice plate 111 to a differential pressure cell 117. Differential pressure cells which will perform the function required are commercially available and one such cell is called a D/P cell, manufactured by the Foxboro Company, Foxboro, Massachusetts, and is shown on page 23 of their bulletin No. 450. A pneumatic signal which is proportional to the pressure differential across orifice plate 111 is produced in cell 117 and is transmitted by a tube 119 to a ratio flow controller 121.

Ratio flow controllers which will perform the function required are also commercially available from several sources. One such controller which is satisfactory is called Foxboro Model 40 Pneumaticset Controller, also manufactured by The Foxboro Company. An orifice plate 123 is connected into line 95. A pair of tubes 125 and 127 convey the differential pressure existing across plate 123 to a differential pressure cell 129. A tube 131 conveys a pneumatic signal which is indicative of the differential pressure across orifice plate 123 to controller 121. A motor valve 133 is connected into conduit 27 downstream of orifice plate 111. A tube 135 is connected from controller 121 to valve 133. Ratio flow controller 121 has an index setting which permits controller 121 to be adjusted so that valve 133 is opened and closed by controller 121 so as to maintain a preselected ratio between the flow of material in conduit 27 and line 95 in accordance with the setting of the index. The index setting for controller 121 may be set by hand or may be automatically adjusted by another instrument which automatically adjusts the index of controller 121 as is desired.

Thus, an analyzer 137 is provided to continuously monitor the composition of the feed stream in line 1. A sample line 139 connects line 1 to analyzer 137 so that a sample of the feed is passed through the analyzer and out a conduit 141. Analyzer 137 is connected by a pair of electrical leads 143 and 145 to a controller 147. Controller 147 converts the electrical output of analyzer 137 to a pneumatic signal which is transmitted by a pipe 149 to the index setting of ratio flow controller 121. The pneumatic signal in pipe 149 is applied to controller 121 so that the index setting is continuously adjusted in response to the composition of the feed stream and in inverse proportion with respect to the proportion of the subsequently crystallized component in the feed mixture as reflected by the output of analyzer 137.

All of the instruments described in this system are commercially available. A suitable analyzer 137 is the Perkin-Elmer Model 93 Bichromator Analyzer manufactured by The Perkin-Elmer Corporation, Norwalk, Connecticut. This instrument is described in vol. 4, No. 2, Winter 1953, of the Perkin-Elmer Instrument News for Science and Industry and in vol. 5, No. 1, Fall 1953, of the same publication. The latter reference sets forth experimental data resulting from the analysis of para-xylene in a stream of mixed xylenes and ethylbenzene which is the type of feed stream used in my system in connection with the embodiment shown in Figure 1. A suitable controller 147 for converting the electrical output of analyzer 137 to a pneumatic signal is the Brown Electronik Potentiometer Controller, having combined therewith the Air-O-Line pneumatic control mechanism, manufactured by The Brown Instrument Company, Philadelphia 44, Pennsylvania. This instrument is described in their bulletin No. 15-4, copyrighted 1942. Controller 147 thus produces a pneumatic signal which is indicative of the composition of the feed stream in line 1 and which is supplied to ratio flow controller 121 to continuously adjust its index setting in accordance therewith.

Referring now to Figure 2, modifications of my invention are shown. In the system shown in Figure 2, the crystal slurry produced in chiller 3 is passed through an in-line filter, indicated generally as 151, rather than through a vacuum filter as was shown in Figure 1. Thus, the slurry is passed out of chiller 3 and through a conduit 153 into an elongated chamber 155 connected to filter 151. The crystals are moved through in-line filter 151, comprising a filter medium 157 and an outer jacket 159 by a piston 161. Piston 161 is moved forward by fluid flow through a conduit 163 acting against a piston 165 which is connected to piston 161 by a piston rod 167. Piston 161 does not have a porous face as did piston 47 in the embodiment shown in Figure 1, and therefore, when the crystals are compacted in chamber 155 and filter 151, non-crystalline material in the crystal slurry is expressed from the crystals and removed from filter 151 via a conduit 169. Further movement of piston 161 forward places the forward face of piston 161 so that is coincides with the side of purification column 45 and, thus, crystals in filter 151 are moved into column 45.

The in-line filter shown in Figure 2 is most effective when used to separate crystals from non-crystalline material where the amount of the component of interest in the feed stream is generally over 50 percent of the feed stream. This is because the in-line filter cannot handle as great volumes of non-crystalline material as can the vacuum filter shown in connection with Figure 1. For example, a feed stream which is preferred for use in the system of Figure 2 is a commercial cyclohexane stream wherein the cyclohexane generally is about 85 percent by volume of the stream. A commercial cyclohexane stream includes, in addition to cyclohexane, small amounts of such materials as methylcyclopentane, 2,2-dimethylpentane, 2,4-dimethylpentane, 3,3-dimethylpentane, 1,1-dimethylcyclopentane, 2,3-dimethylpentane, 2-methylhexane and benzene.

The operation of column 45 to produce a purified product in line 95 and a displaced material, or wall filtrate in line 83 is the same in Figure 2 as that described in connection with Figure 1 and the same reference numerals are given to identical elements. In accordance with the embodiment shown in Figure 2, however, the rate of flow of non-crystalline material, or mother liquor, removed from filter 151 via conduit 169 is maintained in a preselected ratio to the rate of flow of feed entering the system via line 1. To this end, an orifice plate 171 is connected into line 169. A pair of tubes 173 and 175 transmit the differential pressure existing across plate 171 to a differential pressure cell 177. A pneumatic signal which is indicative of the differential pressure across plate 171 is transmitted via a pipe 179 from cell 177 to the ratio flow controller 121. An orifice plate 181 is connected into feed line 1 and the differential pressure existing across plate 181 is transmitted by a pair of pipes 183 and 185 to a differential pressure cell 187. A pneumatic signal which is indicative of the differential pressure across plate 181 is transmitted by a pipe 189 from cell 187 to controller 121. A motor valve 191 is connected into line 169 downstream of plate 171. A pipe 193 conveys a pneumatic signal from controller 121 to valve 191 so that the rate of flow of mother liquor in line 169 is maintained in a preselected ratio to the rate of flow of feed to the system via line 1. Analyzer 137, acting through controller 147 operates to continuously adjust the index setting of controller 121 in response to changes in composition of the feed stream in the same manner as was described in connection with Figure 1.

To further aid in maintaining a constant solids content in the crystalline material fed to column 45, the rate of flow of refrigerant to chiller 3 via conduit 5 is maintained in a preselected ratio to the rate of flow of feed to the system via line 1. To this end, an orifice plate 195 is connected into conduit 5 and is connected by a pair of pipes 197 and 199 to differential pressure cell 201. A pipe 203 transmits a pneumatic signal from cell 201 to a ratio flow controller 205 which is indicative of the differential pressure existing across plate 195. An orifice plate 207 is connected in line 1 and is connected by a pair of pipes 209 and 211 to a differential pressure cell 213. A pipe 215 transmits a pneumatic signal from cell 213 to controller 205 which is indicative of the differential pressure existing across plate 207. A motor valve 217 is connected into conduit 5 downstream of plate 195. A pipe 219 conveys a pneumatic signal from controller 205 to valve 217 to open and close valve 217 so that the rate of flow of refrigerant in line 5 to chiller 3 is maintained in a preselected ratio to the rate of flow of feed in line 1 to the system.

Although the crystal purification column shown in the drawing is operated in a vertical position, it can be operated in any position, including an inverted position. A better understanding of the invention can be obtained by reference to the following example which is intended to exemplify but not unduly restrict my invention.

*Example*

A feed mixture comprising 17 percent by weight para-xylene, 17.5 percent by weight ortho-xylene, 33.4 percent by weight meta-xylene, 27.5 percent by weight ethylbenzene and 4.6 percent by weight toluene is supplied to the chiller at the rate of 857 gallons per hour. Liquid filtrate material recovered from column 45 through filter 81 and conduit 83 contains about 40 percent para-xylene. This stream is returned to chiller 3 via conduit 85 at a rate of 128 gallons per hour so that the total feed to the chiller is 985 gallons per hour. The total feed is cooled to a temperature of —70° C. with the resultant formation of about 15 percent solids. The slurry of mother liquor and crystals is passed to the filter 15 and 769 gallons per hour of mother liquor containing about 6 percent by weight of para-xylene is removed therefrom via conduit 27. The crystals recovered from filter 15 are introduced into the purification column 45 through chamber 43 in the form of a slurry of crystals and mother liquor. The feed to column 45 is 216 gallons per hour of a slurry containing 40 percent by weight solids.

Compacting piston 65 is operated by a conventional power source such as a hydraulic piston and cylinder in such manner that the compacting stroke requires from 20 to 40 seconds and the retracting stroke requires from 3 to 5 seconds. Heat is added to the end portion of the purification column so as to maintain the heating section at a temperature of approximately 27° C. Displaced material, i.e., wall filtrate, is withdrawn from the column through filter 81 and conduit 83 at the rate of 128 gallons per hour and at a temperature of about −10° C. The melted portion is removed from the purification column through conduit 87 at the rate of 88 gallons per hour and a temperature of about 27° C.

Temperature controller 107 is adjusted so as to maintain the filtrate in conduit 83 at a temperature within the range of 0.5 to 2° C. higher than the temperature of the feed to the purification column in chamber 43. When the temperature of the filtrate in conduit 83 tends to rise above the predetermined limits, controller 107 operates so as to open valve 109 and thus lower the pressure on column 45. This reduces the flow of reflux, which reduces the tendency to channel, and thereby lowers the filtrate temperature. When the filtrate temperature tends to go below the minimum limit, the controller 107 operates so as to close valve 109 thus increasing the back pressure on column 45, increasing the amount of reflux, and bringing the purification column closer to channeling conditions, which are also the conditions for maximum production.

The pressure in column 45 is about 100 p.s.i.g. at the start of the compacting stroke of the piston and decreases to about 40 p.s.i.g. at the end of the compacting stroke, but is, of course, substantially reduced during the retracting stroke of the piston. Thus, control of the column is accomplished during the compacting piston strokes.

The product removed through conduit 87 contains about 99 percent by weight para-xylene.

In accordance with this invention, the solids content in the crystal slurry fed from chamber 43 to column 45 is maintained at a constant level by maintaining a preselected ratio between the rate of flow of mother liquor in conduit 27 to the rate of flow of either product removed via line 95 or feed to the process via line 1. In the process of this example, 769 gallons per hour of mother liquor is removed via conduit 27, 88 gallons per hour of product is removed via line 95 and 985 gallons per hour of feed are passed to the process via line 1. Thus, should either the flow of product or of feed increase by 10 percent, ratio flow controller 121 opens valve 133 so as to increase the flow of mother liquor in conduit 27 by 10 percent, and should the flow of product or feed decrease by 10 percent, a corresponding decrease in the flow of mother liquor is effected.

It will be apparent to those skilled in the art that various modifications of this invention can be made upon study of the accompanying disclosure which will be clearly within the spirit and scope of this invention.

I claim:

1. An apparatus for separation of a component of a feed mixture stream by fractional crystallization which comprises, means for adjusting the temperature of said feed mixture stream so as to produce a slurry of crystals of said component thereof in non-crystalline material thereof comprising a conduit means (1) for passing a fluid in heat exchange relationship with said feed mixture, conduit means (2) for passing said feed mixture stream to said temperature adjusting means, means for measuring the rate of flow of said fluid in said conduit means (1), means for measuring the rate of flow of said feed mixture in said conduit means (2), means for controlling said rate of flow of said fluid in conduit means (1) so as to maintain a preselected ratio between the rate of flow of said fluid in conduit means (1) and the rate of flow of said feed mixture in conduit means (2), means for separating crystalline and non-crystalline material, means for passing said slurry to said separating means, an elongated crystal purification chamber comprising, a piston adapted to move crystals therethrough, a crystal inlet, a wall filter, a wall filtrate outlet and a product outlet, means for passing said crystals from said separating means through said crystal inlet to said crystal purification chamber, conduit means (3) for removing non-crystalline material from said separating means, conduit means (4) for removing purified product from said product outlet, means for measuring the temperature differential between said crystal inlet and said wall filtrate outlet, means for controlling the rate of flow of product in said conduit means (4) in response to said temperature differential, means for measuring the rate (5) of flow of non-crystalline material in said conduit means (3), means for measuring the rate (6) of flow of one of said product in said conduit means (4) downstream of said means for controlling the rate of flow of product in said conduit means (4) and the rate of flow of said feed mixture in said conduit means (2), means for controlling said rate (5) so as to maintain a preselected ratio between said rate (5) of flow and said rate (6) of flow, means for analyzing said feed mixture stream in said conduit means (2) comprising means for producing an output signal indicative of the amount of said component in said feed stream, and means for applying said output signal to said means for controlling the rate (5) of flow so as to adjust said preselected ratio between said rate (5) and said rate (6) in response to the amount of said component in said feed stream.

2. An apparatus according to claim 1 wherein said means for measuring said rate (6) of flow is the means for measuring the rate of flow of product in said conduit means (4).

3. An apparatus according to claim 1 wherein said means for measuring said rate (6) of flow is the means for measuring the rate of flow of feed mixture in said conduit means (2).

4. In a process for carrying out fractional crystallization so as to supply a crystal slurry having a substantially constant solids content to a crystal purification zone in which a liquid feed stream mixture is passed to a preconcentration zone, the temperature of said feed mixture in said zone is adjusted so as to obtain crystals of a component of said mixture in non-crystalline material thereof, at least a portion of said non-crystalline material is removed in said zone, the remaining crystals and adhering non-crystalline material are passed from said zone to a crystal purification zone, said crystals are moved as a compact mass through said purification zone to a melting zone, a portion of said crystal mass is melted, a first portion of resulting melt is displaced countercurrently through at least a portion of said crystal mass to thereby displace non-crystalline material from said crystal mass, displaced material is removed from said purification zone and a second portion of said melt is removed from said purification zone as a product stream, the improvement which comprises controlling the rate of flow of said product removed from the purification zone so as to maintain a preselected ratio between the temperature of said displaced material removed from said purification zone and the temperature of said crystals and adhering non-crystalline material passed to said crystal purification zone and controlling the rate of flow of said non-crystalline material removed from said pre-concentration zone so as to maintain a pre-selected ratio between the rate of flow of non-crystalline material removed from the pre-concentration zone and the rate of flow of one of said streams.

5. A method according to claim 4 wherein the rate of flow of non-crystalline material removed from said pre-concentration zone is controlled so as to maintain a preselected ratio between said rate of flow of non-crystalline material and the rate of flow of product removed from said purification zone.

6. A method according to claim 4 wherein the rate of flow of non-crystalline material removed from said pre-concentration zone is controlled so as to maintain a preselected ratio between said rate of flow of non-crystalline material and the rate of flow of said feed mixture passed to said preconcentration zone.

7. In a process for carrying out fractional crystallization so as to supply a crystal slurry having a substantially constant solids content to a crystal purification zone in which process a liquid feed stream mixture is passed to a pre-concentration zone, the temperature of said mixture is adjusted in said zone so as to obtain crystals of a component of said mixture in non-crystalline material thereof, as least a portion of said non-crystalline material is removed in said zone, the remaining crystals and adhering non-crystalline material from said zone are passed to a crystal purification zone, said crystals are moved as a compact mass through said purification zone to a melting zone, a portion of said crystal mass is melted, a first portion of resulting melt is displaced countercurrently through at least a portion of said crystal mass to thereby displace non-crystalline material from said crystal mass, said displaced material is removed from said purification zone and a second portion of said melt is removed from said purification zone as a product stream, the improvement which comprises controlling the rate of flow of said product removed from the purification zone so as to maintain a preselected ratio (1) between the temperature of said displaced material removed from said purification zone and the temperature of said crystals and adhering non-crystalline material passed to said crystal purification zone, controlling the rate of flow of said non-crystalline material removed from said pre-concentration zone in a ratio flow controlling zone so as to maintain a preselected ratio (2) between the rate of flow of non-crystalline material removed from the pre-concentration zone and the rate of flow of one of said streams, constantly passing a sample of said feed mixture through an analysis zone, producing a signal in said analysis zone which is indicative of the proportion of said component in said feed mixture and passing said signal to said ratio flow controlling zone so as to constantly adjust said ratio (2) in inverse proportion with respect to the proportion of said component in said feed mixture.

8. In a process for carrying out fractional crystallization so as to supply a crystal slurry having a substantially constant solids content to a crystal purification zone in which a liquid feed stream mixture is passed to a pre-concentration zone comprising a cooling zone and a filtering zone, a refrigerant is passed in heat exchange relationship with said feed mixture in said cooling zone so as to cool said feed mixture to obtain a slurry of crystals of a component of said mixture in non-crystalline material thereof, said slurry of crystals and non-crystalline material is passed from said cooling zone to said filtering zone, said slurry is filtered to produce non-crystalline material (A) and crystals (B) of said component and adhering non-crystalline material, said non-crystalline material (A) is removed from said filtering zone, said crystals (B) and adhering non-crystalline material are passed to a crystal purification zone, said crystals (B) and adhering non-crystalline material are moved as a compact mass through said purification zone to a melting zone, a portion of said crystal mass is melted, a first portion of resulting melt is displaced countercurrently through at least a portion of said crystal mass to thereby displace non-crystalline material from said crystal mass, said displaced material is removed from said purification zone and a second portion of said melt is removed from said purification zone as a product stream, the improvement which comprises controlling the rate of flow of said refrigerant in said cooling zone so as to maintain a predetermined ratio (1) between the rate of flow of refrigerant and the rate of flow of said feed mixture into said preconcentration zone, controlling the rate of flow of said product removed from the purification zone so as to maintain a pre-selected ratio (2) between the temperature of said displaced material removed from said purification zone and the temperature of said crystals (B) and adhering non-crystalline material passed from said filter zone to said purification zone and controlling the rate of flow of said non-crystalline material (A) removed from said filter zone so as to maintain a preselected ratio (3) between the flow rate of non-crystalline material removed from said filter zone and the flow rate of one of said streams.

9. A method according to claim 8 wherein the rate of flow of non-crystalline material removed from said pre-concentration zone is controlled so as to maintain a preselected ratio between said rate of flow of non-crystalline material and the rate of flow of product removed from said purification zone.

10. A method according to claim 8 wherein the rate of flow of non-crystalline material removed from said pre-concentration zone is controlled so as to maintain a preselected ratio between said rate of flow of non-crystalline material and the rate of flow of said feed mixture passed to said preconcentration zone.

11. In a process for carrying out fractional crystallization so as to supply a crystal slurry having a substantially constant solids content to a crystal purification zone in which process a liquid feed stream mixture is passed to a pre-concentration zone, the temperature of said mixture is adjusted in said zone so as to obtain crystals of a component of said mixture in non-crystalline material thereof, at least a portion of said non-crystalline material is removed in said zone, the remaining crystals and adhering non-crystalline material from said zone are passed to a crystal purification zone, said crystals are moved as a compact mass through said purification zone to a melting zone, a portion of said crystal mass is melted, a first portion of resulting melt is displaced countercurrently through at least a portion of said crystal mass to thereby displace non-crystalline material from said crystal mass, said displaced material is removed from said purification zone and a second portion of said melt is removed from said purification zone as a product stream, the improvement which comprises controlling the rate of flow of said non-crystalline material removed from said pre-concentration zone to maintain a preselected ratio between the rate of flow of said non-crystalline material from said pre-concentration zone and the rate of flow of one of said streams, analyzing said feed and determining therein the concentration of said component, and adjusting said ratio by decreasing the same when said concentration exceeds a predetermined value and increasing the same when said concentration becomes less than a predetermined value.

12. In a process for carrying out fractional crystallization so as to supply a crystal slurry having a substantially constant solids content to a crystal purification zone in which process a liquid feed stream mixture is passed to a pre-concentration zone comprising a cooling zone and a filtering zone, a refrigerant is passed in heat exchange relationship with said feed mixture in said cooling zone so as to cool said feed mixture to obtain a slurry of crystals of a component of said mixture in non-crystalline material thereof, said slurry of crystals and non-crystalline material are passed from said cooling zone to said filtering zone, said slurry is filtered to produce non-crystalline material (A) and crystals (B) of said component and adhering non-crystalline material, said non-crystalline material (A) is removed from said filtering zone, said crystals (B) and adhering non-crystalline material are passed to a crystal purification zone, said crystals (B) and adhering non-crystalline material are moved as a compact mass through said purification zone to a melting zone, a portion of said crystal mass is melted, a first portion of resulting melt is displaced countercurrently through at least a portion of said crystal mass to thereby displace non-crystalline material from said crystal mass, said displaced material is removed from said purification zone and a second portion of said melt is removed from said purification zone as a product stream, the improvement which comprises controlling the rate of flow of said refrigerant in said cooling zone so as to maintain a predetermined ratio between the rate of flow of refrigerant and the rate of flow of said feed mixture into said preconcentration zone, and controlling the rate of flow of said non-crystalline material (A) removed from said filter zone so as to maintain a preselected ratio (3) between the flow rate of non-crystalline material removed from said filter zone and the flow rate of one of said streams.

13. An apparatus for separation of a component of a feed mixture stream by fractional crystallization which comprises, means for adjusting the temperature of said feed mixture stream so as to produce a slurry of crystals of said component thereof in non-crystalline material thereof comprising a conduit means (1) for passing a fluid in heat exchange relationship with said feed mixture, conduit means (2) for passing said feed mixture stream to said temperature adjusting means, means for measuring the rate of flow of said fluid in said conduit means (1), means for measuring the rate of flow of said feed mixture in said conduit mean (2), means for controlling said rate of flow of said fluid in conduit means (1) so as to maintain a preselected ratio between the rate of flow of said fluid in conduit means (1) and the rate of flow of said feed mixture in conduit means (2), means for separating crystalline and non-crystalline material, means for passing said slurry to said separating means, an elongated crystal purification chamber comprising, a piston adapted to move crystals therethrough, a crystal inlet, a wall filter, a wall filtrate outlet and a product outlet, means for passing said crystals from said separating means through said crystal inlet to said crystal purification chamber, conduit means (3) for removing non-crystalline material from said separating means, conduit means (4) for removing purified product from said product outlet, means for measuring the rate (5) of flow of non-crystalline material in said conduit means (3), means for measuring the rate (6) of flow of one of said product in said conduit means (4) and said feed mixture in said conduit means (2), means for controlling said rate (5) so as to maintain a preselected ratio between said rate (5) of flow and said rate (6) of flow, means for analyzing said feed mixture stream in said conduit means (2) comprising means for producing an output signal indicative of the amount of said component in said feed stream, and means for applying said output signal to said means for controlling the rate (5) of flow so as to adjust said preselected ratio between said rate (5) and said rate (6) in response to variations in the amount of said component in said feed stream.

14. Apparatus according to claim 3 and containing the following additional elements in combination: an additional means for measuring the rate of flow of said feed mixture in said conduit means (2), means for measuring the rate of flow of fluid in said conduit means (1), and means for maintaining a preselected ratio between said last two-mentioned rates of flow.

References Cited in the file of this patent

UNITED STATES PATENTS

| | | |
|---|---|---|
| 2,352,584 | Zieboltz et al. | June 27, 1944 |
| 2,530,976 | Martin | Nov. 21, 1950 |
| 2,632,314 | Vance | Mar. 24, 1953 |
| 2,683,178 | Findlay | July 6, 1954 |
| 2,815,288 | McKay | Dec. 3, 1957 |